(12) United States Patent
Gault et al.

(10) Patent No.: US 6,527,302 B1
(45) Date of Patent: Mar. 4, 2003

(54) UNIVERSAL CONDUIT BODY AND SYSTEM

(76) Inventors: Greg D. Gault, 1233 Dove Dr., Ashland, OH (US) 44805; James R. Streng, 1094 Cooper Dr., Ashland, OH (US) 44805

( * ) Notice: Subject to any disclaimer, the term of this patent is extended or adjusted under 35 U.S.C. 154(b) by 0 days.

(21) Appl. No.: 09/891,831

(22) Filed: Jun. 26, 2001

(51) Int. Cl.[7] .............................................. F16L 51/00

(52) U.S. Cl. ................................ 285/125.1; 285/126.1; 285/129.1; 285/129.2; 285/130.1; 285/152.1; 285/154.1; 285/149.1; 285/907; 220/3.2; 174/50

(58) Field of Search .......................... 285/125.1, 126.1, 285/129.1, 129.2, 130.1, 907, 152.1, 154.1, 149.1; 174/50; 220/3.2

(56) References Cited

U.S. PATENT DOCUMENTS

| | | | | |
|---|---|---|---|---|
| 259,045 A | * | 6/1882 | Richardson | 285/150.1 |
| 593,841 A | * | 11/1897 | Greenfield | 220/3.2 |
| 899,637 A | * | 9/1908 | Vibber | 174/61 |
| 982,535 A | | 1/1911 | Rudkiewicz | |
| 1,120,472 A | | 12/1914 | Freeman | |
| 1,402,769 A | | 1/1922 | Hirshfeld | |
| 1,777,504 A | | 10/1930 | Selah | |
| 1,850,759 A | | 3/1932 | Macneil | |
| 2,360,304 A | | 10/1944 | McLoughlin et al. | |
| 2,620,081 A | * | 12/1952 | Lear | 220/3.8 |
| 2,640,619 A | | 6/1953 | Schneiderman | |
| 2,697,535 A | * | 12/1954 | Olson | 220/3.2 |
| 3,538,940 A | * | 11/1970 | Graham | 137/271 |
| 3,570,534 A | * | 3/1971 | Beavers | 137/594 |
| 3,728,470 A | * | 4/1973 | Maier | 174/58 |
| 3,736,955 A | * | 6/1973 | Schlesser | 137/561 |
| 3,870,347 A | * | 3/1975 | Haubenestel | 285/156 |
| 3,927,249 A | * | 12/1975 | Pearse | 174/51 |
| 4,248,459 A | * | 2/1981 | Pate et al. | 285/319 |
| 4,438,859 A | * | 3/1984 | Solek | 220/3.2 |
| 4,936,478 A | | 6/1990 | Bozdeck | |
| 5,727,706 A | * | 3/1998 | Richter | 220/3.2 |
| 5,964,481 A | * | 10/1999 | Buch | 285/18 |
| 6,069,317 A | | 5/2000 | Wagganer | |

FOREIGN PATENT DOCUMENTS

| | | | | |
|---|---|---|---|---|
| DE | 4011569 A | * | 10/1991 | 285/FOR 108 |
| GB | 667023 A | * | 2/1952 | 285/FOR 108 |
| GB | 2121134 A | * | 12/1983 | 285/FOR 108 |

OTHER PUBLICATIONS

Appleton Electric Company Catalog, Unilets® Conduit Bodies and Boxes, p. A–1.
Appleton Electric Company Catalog, Unilet® Conduit Outlet Bodies: FM7™, Form 8™, Form 35® and Form85, p. A–2.
Appleton Electric Company Catalog, Unilet® Conduit Outlet Bodies: FM7™, FM8™, Form 35® and Form 85, p. A–3.
Appleton Electric Company Catalog, FM8™ Grayloy™–Iron Conduit Bodies and Covers; FM7™ Grayloy™–Iron and Aluminum Unilet® Conduit Bodies: Wedge–Lok™ Clip Covers, p. A4.
Appleton Electric Company Catalog, FM7™ Grayloy™–Iron and Aluminum Unilet® Conduit Bodies with Wedge–Lok™ Clip Covers, p. A–5.

(List continued on next page.)

Primary Examiner—J. J. Swann
Assistant Examiner—Carlos Lugo
(74) Attorney, Agent, or Firm—Nenad Pejic; Calfee, Halter & Griswold LLP

(57) ABSTRACT

A universal conduit body system is provided having an outer housing having a first wall thickness, at least one port and an inner space. Each port has an opening in the housing and a recess in the housing surrounding the opening. Each recess includes a second wall thickness less than the first wall thickness. In use, the port mates with a connector that includes an interface having substantially the same physical shape as the recess.

20 Claims, 8 Drawing Sheets-

OTHER PUBLICATIONS

Appleton Electric Company Catalog, Appleton FM7 Conduit Body Dimension, p. A–6.
Appleton Electric Company Catalog, FM8™ Grayloy™–Iron Unilet® Conduit Bodies with Covers and Gaskets, p. A–6A.
Appleton Electric Company Catalog, FM8™ Conduit Body Dimensions, p. A–6B.
Appleton Electric Company Catalog, Form 35® Malleable Iron Unilet® Conduit Outlet Bodies, p. A–7.
Appleton Electric Company Catalog, Covers and Gaskets for Form 35® Unilet® Conduit Outlet Bodies, p. A–8.
Appleton Electric Company Catalog, Dimensions: Form 35® Malleable Iron Unilet® Conduit Outlet Bodies, p. A–9.
Appleton Electric Company Catalog, Form 85® Aluminum Unilet® Conduit Outlet Bodies, p. A–10.
Appleton Electric Company Catalog, Covers and Gaskets for Form 85 Unilet® Conduit Outlet Bodies, p. A–11.
Appleton Electric Company Catalog, Dimensions: Form 85 Threaded and Setscrew Unilet® Conduit Outlet Bodies, Aluminum, p. A–12.
Appleton Electric Company Catalog, Mogul Unilet® Conduit Outlet Bodies: NEC 6x8x Series (C, LB and UB) and Types LL, LR and T, p. A–13.
Appleton Electric Company Catalog, NEC 6x8x Series Mogul Unilets® and LL, LR and T Type Mogul Unilets: Malleable Iron or Aluminum, p. A–14.
Appleton Electric Company Catalog, Bending RADII and Bending SPACE of Appleton LB and UB Moguls, p. A–15.
Appleton Electric Company Catalog, NEC 6x8x Series Moguls (C, LB and UB) Comply with NEC Large–Wire Requirements, p. A–16.
Appleton Electric Company Catalog, NEC 6x8x Series Moguls (C, LB and UB) Comply with NEC Large–Wire Requirements, p. A–17.
Appleton Electric Company Catalog, Dimensions in Inches: Mogul Types C, T, LL and LR., p. A–18.
Appleton Electric Company Catalog, Dimensions in Inches: Mogul Types LB and UB, p. A–19.
Appleton Electric Company Catalog, Unilet® Conduit Outlet Bodies: LBD and LBDN. Conduit Outlet Boxes: JB, GS, and SEH, p. A–20.
Appleton Electric Company Catalog, LBD and LBDN Pulling Fittings: Malleable Iron, Aluminum, p. A–21.
Appleton Electric Company Catalog, Big–Bend™ Cast Pulling Elbow, p. A–22.
Appleton Electric Company Catalog, Big–Bend™ Cast Pulling Elbow, p. A–23.
Appleton Electric Company Catalog, JB Conduit Outlet Boxes, Covers, and Hangers: Malleable Iron, Aluminum, p. A–24.
Appleton Electric Company Catalog, GS Conduit Outlet Boxes, Covers and Hangers: Malleable Iron, p. A–25.
Appleton Electric Company Catalog, SEH Conduit Outlet Boxes and Covers: Malleable Iron, p. A–26.
Appleton Electric Company Catalog, Dimensions: JBX, JBDX, JBLX, and GS Conduit Outlet Boxes, p. A–27.
Appleton Electric Company Catalog, Wiring Capacity: Cast Conduit Outlet Bodies and Boxes: Cubic Inches, p. A–28.
Appleton Electric Company Catalog, Wiring Capacity: Cast Conduit Outlet Bodies and Boxes; Cubic Inches, p. A–29.
Appleton Electric Company Catalog, Pull Boxes with Threaded Hubs and Covers, p. A–30.
Appleton Electric Company Catalog, FS and FD Cast Device Boxes, p. B–1.
Appleton Electric Company Catalog, FS and FD Cast Device Boxes: Malleable Iron, Aluminum, p. B–2.
Appleton Electric Company Catalog, FDB Cast Device Boxes: Single and Multiple Gang Blank Bodies for Drilling and Tapping, p. B–14.
Appleton Electric Company Catalog, Dimensions: FDB Single and Multiple Gang Device Boxes; Blank Bodies for Drilling and Tapping, p. B–15.
Appleton Electric Company Catalog, Ordering Information: FDB Cast Device Boxes; Blank Bodies for Drilling and Tapping, p. B–16.
Appleton Electric Company Catalog, Ordering Information: FDB Cast Device Boxes; Blank Bodies for Drilling and Tapping, p. B–17.
Appleton Electric Company Catalog, FDH Cast Device Boxes: Single and Multiple Gang; Blank Bodies for Brazed Hubs, p. B–18.
Appleton Electric Company Catalog, FDH Cast Device Boxes: Single and Multiple Gang; Blank Bodies for Brazed Hubs, p. B–19.
Appleton Electric Company Catalog, Dimensions: FS and FD Single and Multiple Gang Device Boxes; Blank Bodies for Brazed Hubs, p. B–20.
Appleton Electric Company Catalog, Covers for FS and FD Four Gang Single Cover Device Boxes, p. B–21.
Appleton Electric Company Catalog, Ordering Information: FDH Cast Device Boxes; Blank Bodies for Brazed Threaded Hubs, p. B–22.
Appleton Electric Company Catalog, Ordering Information: FDH Cast Device Boxes; Blank Bodies for Brazed Threaded Hubs, p. B–23.
Appleton Electric Company Catalog, Wiring Capacity: FS and FD Cast Device Boxes; Cubic Inches and Cubic Centimeters, p. B–24.
Appleton Electric Company Catalog, Cast Junction Boxes, p. C–1.
Appleton Electric Company Catalog, RS Series Malleable Iron Junction Boxes; Hub Plates in Four Styles, p. C–2.
Appleton Electric Company Catalog, RS Junction Boxes, Covers and Gaskets; Malleable Iron, p. C–3.

* cited by examiner

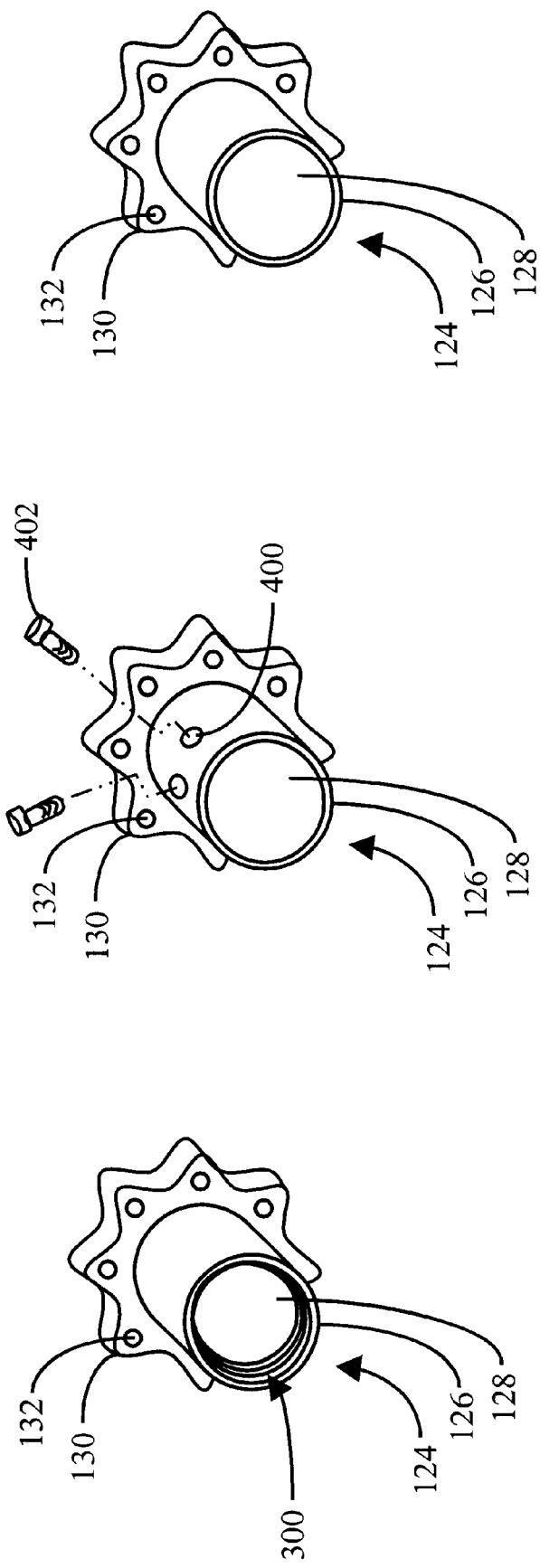

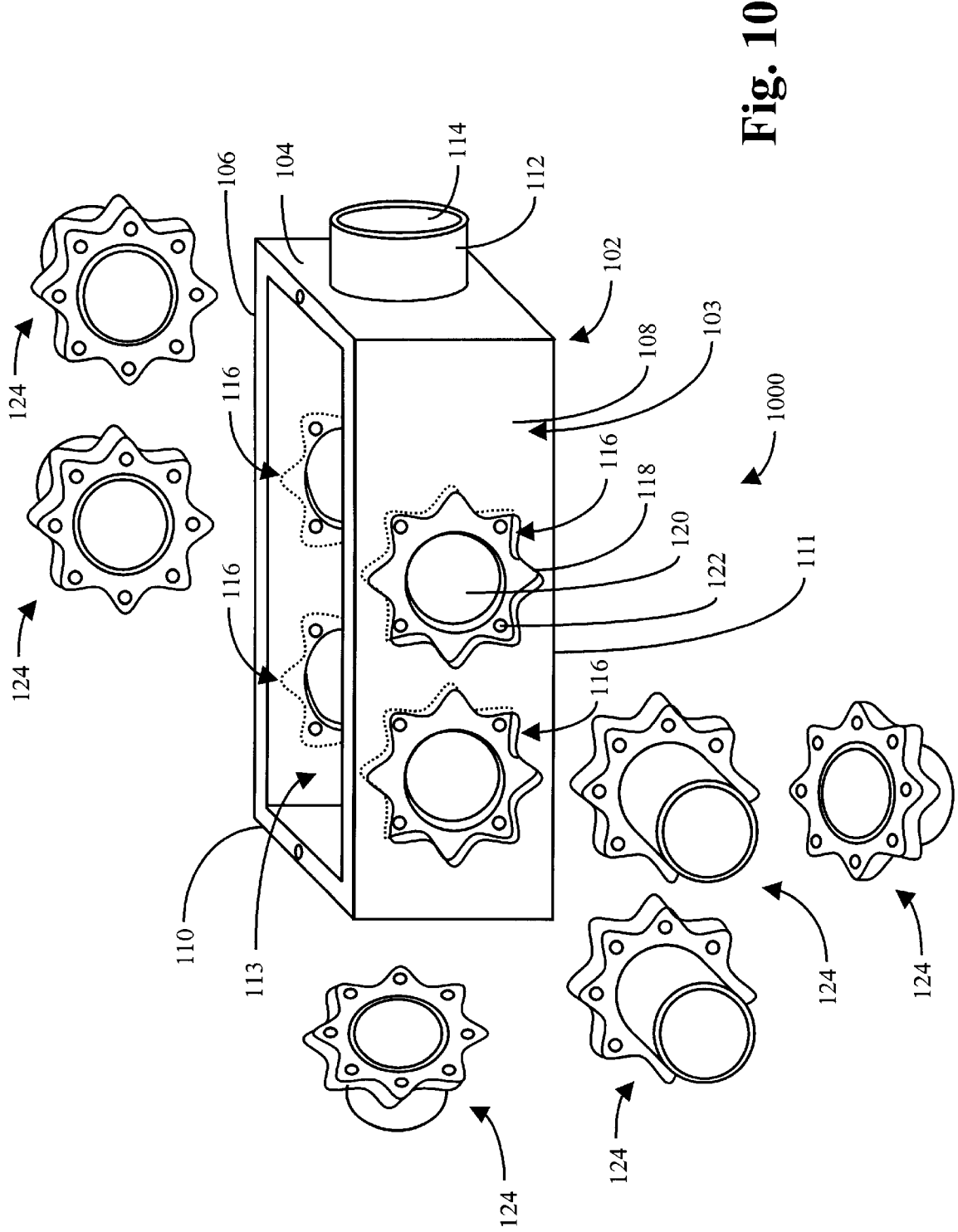

UNIVERSAL CONDUIT BODY AND SYSTEM

FIELD OF THE INVENTION

The invention relates generally to electrical system wiring and, more particularly, to a universal conduit body and system that can be assembled into a wide variety of different configurations to meet the specific needs of an installation.

BACKGROUND OF THE INVENTION

In residential, commercial, and industrial electrical installations, a system comprising of runs of conduit is employed for the distribution of electrical wiring throughout the premises. A "conduit" is a metal or plastic pipe or tubing utilized for the purpose of carrying insulated electrical wires. As such, conduits provide a convenient and effective way to: (1) gather electrical wires or conductors together, (2) make wiring connections, (3) protect the wires from damage or wear from the elements and against mechanical disturbances, and (4) provide a pathway from an electrical distribution panel, for example, to the various locations of electrical fixtures, equipment, machinery, appliances, and receptacles as may be desired throughout the premises. These insulated wires are designed to carry relatively high voltages and currents (carrying 0 up to 2000 volts and 0 up to 750 amps). Conduit is also widely used to contain optic fibers and/or signal or control wire (i.e., wire operating at a lower voltage with a maximum of 110 volts down to millivolts, serving to actuate switches and thermostats, or, in the case of telephone and data, wire for communications and computers).

Conduit systems themselves include more than just metal or plastic conduits. They also include conduit bodies, fittings, couplings, and other similar devices that are used as interconnection mechanisms between individual conduits or conduit systems. For example, conduit bodies enable sharp changes in direction to be made in a conduit run and, in this regard, are to be contrasted with elbows, which are bent portions of conduit. Additionally, conduit bodies can be coupled to straight conduit runs by suitable connectors. Tubular conduits typically attach to conduit bodies by means of connectors.

One drawback of prior conduit bodies is that they have evolved into a wide variety of sizes and configurations. In this regard, an electrician or other user must have available a wide variety of different conduit bodies for a particular job. Standard conduit bodies are coded ST, LB, LL, LR, and T. The ST configuration is provided as a straight through conduit body used to aid the electrician in pulling wires in a long run. The LB configuration provides a right angle turn along the length of the conduit body extending oppositely away from the removable cover (through the bottom). The LL configuration provides a right angle turn along the length of the conduit body extending to the left of the removable cover. The LR configuration provides a right angle turn along the length of the conduit body to the right of the removable cover. The T configuration provides two points of connecting conduit at opposite longitudinal ends of the conduit body, and a "tee" connector extending on one or more sides of the conduit body. When using the prior type of conduit body, not only must the electrician carry a sufficient supply of all configurations of these conduit bodies to the job site, but, there must be a variety of conduit bodies for each size of conduit likely to be employed on the job. Thus, for an electrician to be adequately equipped, a very large variety of conduit bodies must be available.

Another drawback of prior conduit bodies is that once they have been installed, subsequent changes in arrangement of the connected conduits, such as the attachment of an additional branch conduit run, has typically required that the conduit body be removed and replaced entirely. This procedure necessitates removal of all existing wires, removal and replacement of the conduit body with a new appropriately configured conduit body, reinstallation of the original wires, and installation of the new wires in the additional run. This procedure is inconvenient, time consuming, and expensive.

Thus, an unsolved need exists for an improved conduit body and system that overcomes the limitations and drawbacks of the prior designs.

SUMMARY OF THE INVENTION

One objective of the present invention is to provide a universal conduit body that is adaptable by the user at the job site into a virtually unlimited number of differing physical configurations.

Another objective of the present invention is to provide a universal conduit body that is reconfigurable after original installation by the addition or removal of connectors without the need for the removal and replacement of the conduit body or the originally installed electrical wires.

Another objective of the present invention is to provide a conduit body that has a universal body that is fitted on its sides and/or ends with a variety of removable cover plates and wherein each cover plate may be replaced with one or more connectors for attachment to conduits.

In accordance with these objective, a universal conduit body is provided having an outer housing having a first wall thickness, at least one port and an inner space. Each port has an opening in the housing and a recess in the housing surrounding the opening. Each recess includes a second wall thickness less than the first wall thickness. In use, the port mates with a connector that includes an interface having substantially the same physical shape as the recess. A removable port cover plate is provided to close any unused ports.

Configured as such, the present invention provides the ability to attach the connector to the conduit first, then once secure on the conduit, the connector can be attached to the conduit body. When using the prior conduit body in tight locations, it could not be rotated to thread the conduit into the connector, the present invention permits the connector to be threaded on to the conduit prior to connecting to the conduit body. This design also permits multiple conduit bodies to be stacked side by side during installation whereby access to the screws securing the connectors to the conduit body would be maintained through the interior of the conduit body.

These and other objectives, aspects, advantages and features of the present invention will be more fully understood and appreciated upon consideration of the following detailed description of the preferred conduit bodies presented in conjunction with the accompanying drawings.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIGS. 3, 4, and 5 are perspective views of multiple embodiments of a connector of the present invention.

FIG. 10 illustrates the system of FIG. 1 with multiple connectors.

DETAILED DESCRIPTION OF ILLUSTRATED EMBODIMENT

Figure 1:
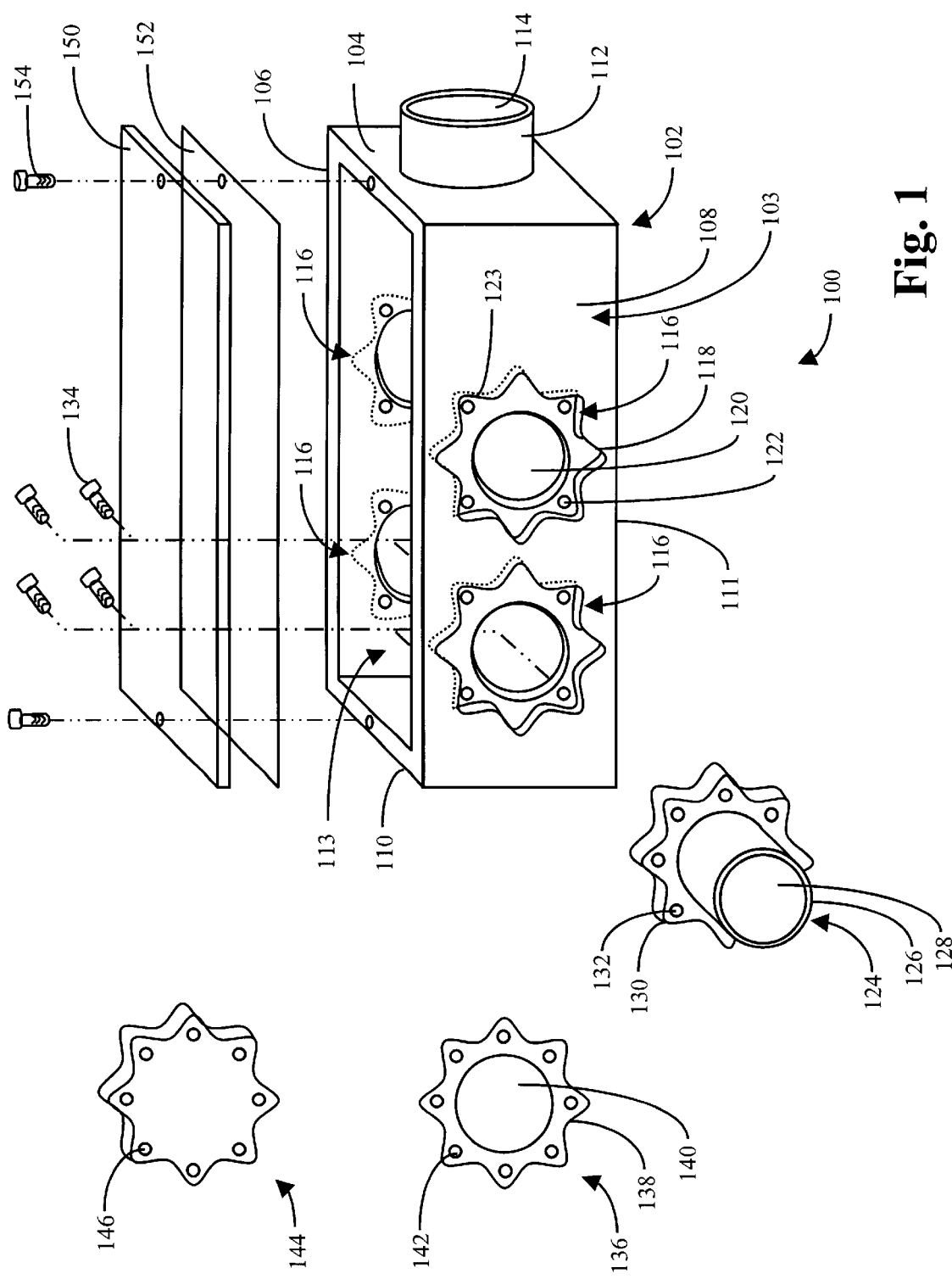
FIG. 1 is a perspective view of a first system of the present invention.

Referring to FIG. 1, a system 100 of the present invention is shown. System 100 has a conduit body 102 with associated cover plate 150 and optional gasket 152, connector 124, optional port gasket 136, and port cover plate 144. Conduit body 102 is preferably any portion of a conduit or tubing system that provides access through a removable cover(s) to the interior of the system at a junction of two or more sections of the system or at a terminal point of the system—including boxes such as FS and FD or larger cast or sheet metal boxes. As shown in FIG. 1, conduit body 102 has a housing 103 having side walls 104, 106, 108, 110, and 111. The aforementioned side walls cooperate to form a hollow inner space 113. Side wall 104 has a cylindrically-walled stub 112 forming a hollow inner space 114. Stub 112 is used for affixing or other connecting a first conduit to conduit body 102. Spaces 113 and 114 together form a freely communicating unitary hollow space. Of the remaining side walls 106, 108, 110, and 111, each has at least one port 116 for facilitating connection with one or more connectors 124. In the embodiment of FIG. 1, side walls 106 and 108 have two ports 116, side wall 111 has two ports 116 (not shown), and side wall 110 has one port 116 (not shown). All of the ports 116 are of the same construction for a given embodiment.

In this regard, port 116 has an aperture 120 through its respective side wall that is surrounded by a recess or indentation 118 in the side wall. Recess 118 has a shape that includes a number of extensions or projections 123. In the embodiment of FIG. 1, recess 118 has a star shape with eight extensions. In other embodiments employed a star-shaped recess 118, there can be more or less than 8 extensions. In general, the shape of recess 118 can be any shape that proves suitable for the purpose of alignment. For example, the shape of recess 118 can be a polygon having three or more sides or a star-shape with any number of extensions. Additionally, the shape of recess 118 can incorporate curved, orthogonal, or angled extensions. The embodiment of FIG. 1 illustrates a star-shaped recess 118 wherein the extensions are curved.

Each port 116 also has one or more holes 122 for the securing of fasteners such as screws or bolts. Holes 122 are preferably located within the bounds of extensions 123 and extend from the bottom of the recess and on through the remainder of the side wall thickness so as to communicate with inner space 113. The embodiment of FIG. 1 illustrates such holes 122 for each port or one in every other extension 123. Depending on the design, more or less such holes can be provided. For example, each extension 123 can have a hole 122 therein.

Recess 118 surrounds aperture 120 and has a recess depth that is less than the side wall thickness. The actual recess depth or thickness and side wall thickness depend on the type of material from which system 100 and conduit body 102 are made. In this regard, suitable materials for forming system 100 and its components includes metals such as aluminum, steel, or iron, and plastics such as PVC or CPVC.

Connector 124 preferably has a cylindrically-walled stub 126 and an alignment interface 130. The cylindrically-walled stub 126 forms an inner hollow space 128. Alignment interface 130 is configured to at least partially fit within recess 118. More specifically, alignment interface 130 has a shape that corresponds to the shape of recess 118. In the embodiment of FIG. 1, recess 118 has a star-like shape with eight extensions. Alignment interface 130 has a corresponding star-like shape also with eight extensions. So configured, alignment interface 130 can be at least partially inserted within recess 118 so as to provide proper alignment of connector 124 and restrict the movement of connector 124 when so in place.

In the embodiment of FIG. 1, connector 124 is fastened to conduit body 102 through one or more screws or bolts 134 and holes 132 in the alignment interface. In particular, alignment interface 130 is used to properly align connector 124 within recess 118. The shape of alignment interface 130 is such that it facilitates the rotating or turning thereof either by hand or tool to arrive at the proper alignment. Once so aligned, screws or bolts 134 are threaded through hole. 122 in the recess side wall and holes 132 in the alignment interface 130. The embodiment of FIG. 1 shows screws or bolts 134 fastening connector 124 to conduit body 102 via the interior hollow space 113 of conduit body 102. It should be noted that screws or bolts 134 can also be used from the exterior of the conduit body 102 to fasten connector 124. Once attached, inner hollow space 128 cooperates with interior hollow space 113 to form a freely communicating unitary hollow space for running wires or conductors there through.

The port gasket 136 is optional and can be placed in between the alignment interface 130 and recess 118 to provide an air or water-tight seal. In this regard, the port gasket 136 is configured to fit within recess 118. More specifically, port gasket 136 has an aperture or hole 140 therein and a shape that also corresponds to the shape of recess 118. In the embodiment of FIG. 1, recess 118 has a star-like shape with eight extensions. Hence, port gasket 136 also has a star-like shape with eight extensions. Holes 142 are provided in port gasket 136 that properly align with holes 132 in the alignment interface 130 and holes 122 in the recess side wall. Port gasket 136 can be made of any conventional gasket material 138 such as, for example, silicon or rubber. In the alternative, port gasket 136 can be a conventional o-ring appropriately sized to seal recess 118.

The port cover plate 144 is utilized for covering any exposed ports 116 that are not in use. In this regard, port cover plate 144 also has a shape that corresponds to the shape of recess 118. As described above, shape of recess 118 in FIG. 1 is that of a star with eight extensions. Therefore, the shape of port cover plate 144 is also that of a star with eight extensions. Port cover plate 144 also includes therein holes 146 for alignment with holes 122 in the recess side wall. Screws or bolts are used to attach port cover plate 144 to conduit body 102 in the same manner as that of connector 124. Port cover plate 144 is preferably made of the same material as system 100.

Conduit body cover plate 150 and optional gasket 152 are provided to close conduit body 102 when installation is complete. Conduit body cover plate 150 and gasket 152 have holes therein for screws or bolts that are used to fasten the cover plate 150 and gasket 152 to conduit body 102. Gasket 152 can also be in the conventional form of an o-ring or gasket ring.

In operation, a conduit is affixed to cylindrically-walled stub 126 of connector 124. Once affixed, the alignment interface 130 of connector 124 is used to align connector 124 with recess 118 in conduit body 102. In this regard, since both the recess 118 and alignment interface 130 are star-shaped with eight extensions, no more than an eighth of a turn of connector 124 is required for proper alignment. Hence, this eight point shape allows multiple connection points throughout the rotation of the connector 124. It should now also be evident as to the effect of providing more or less than eight points of connection.

In this regard, the present invention provides for the ability to attach connector 124 to a conduit first, then once secure on the conduit, connector 124 can be attached to conduit body 102 by means of screws 134 that pass through the conduit body 102 recess side wall holes 122 into threaded screw holes or openings 132 in alignment interface 130. Holes 122 can also be threaded if desired. When using the prior conduit body in tight locations, it could not be rotated to thread the conduit into the connector. The present invention permits connector 124 to be threaded or otherwise affixed to the conduit prior to connecting to conduit body 102. This design also permits multiple conduit bodies to be stacked side by side during installation whereby access to the screws securing the connectors to the conduit body would be maintained through the interior of the conduit body.

Figure 2:
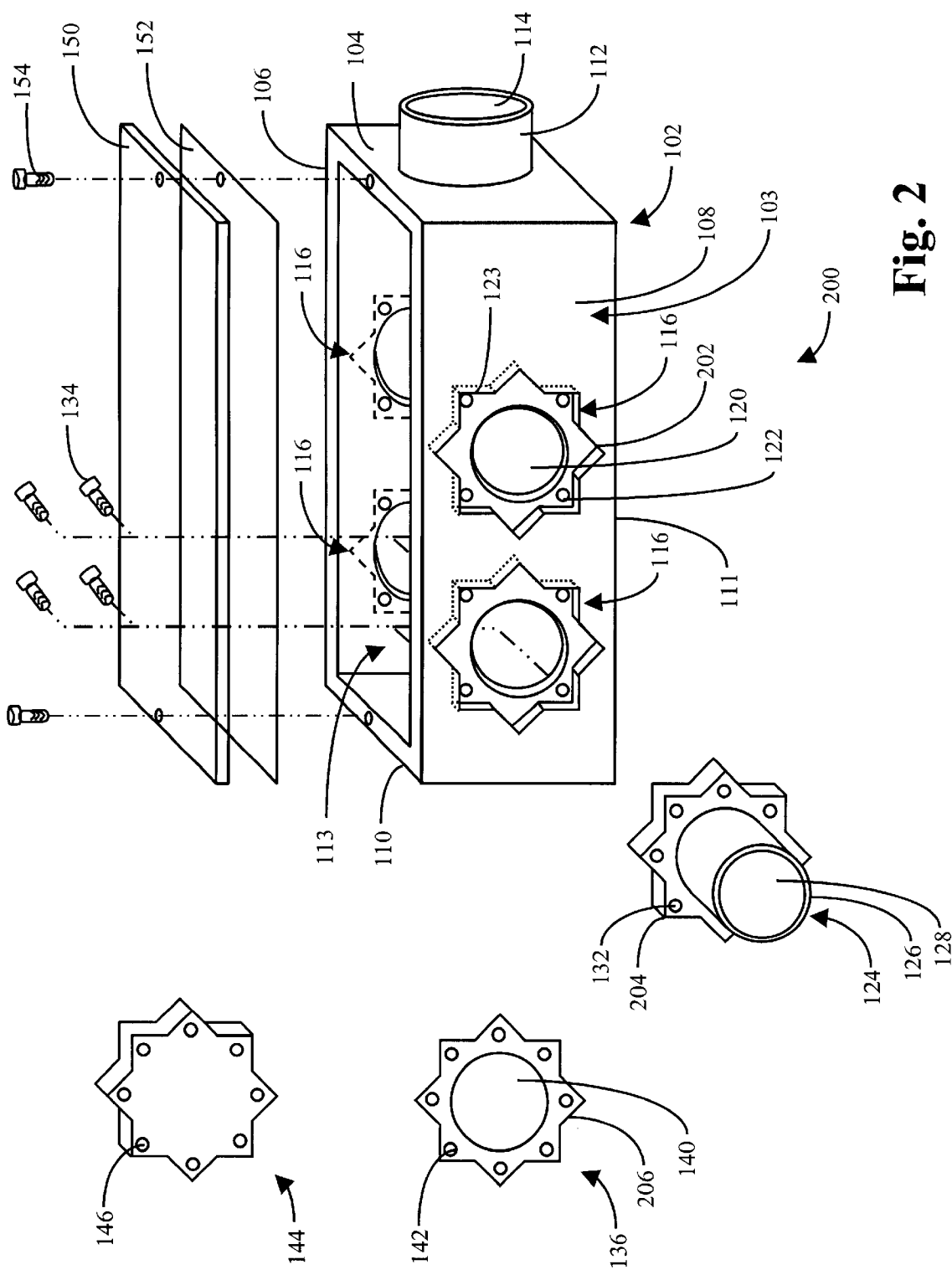
FIG. 2 is a perspective view of a second system of the present invention.

Referring now to FIG. 2, a second system 200 is illustrated. System 200 is identical to system 100, except for the shape of the recesses, alignment interface, port gasket and port cover plate. In this regard, system 200 incorporates a polygon-shaped recess 202. The polygon shape is in the form of an octagon, or eight-sided figure. As described above, more or less than eight-sided polygons can also be used. In accord therewith, connector 124 also includes an alignment interface 204 having polygon shape that is also eight-sided. Similarly, port gasket 136 also includes a polygon shape 206 that is eight-sided, as also does port cover plate 144. Otherwise, systems 100 and 200 offer the same operation, advantages, and benefits.

Illustrated in FIGS. 3, 4, and 5 are various embodiments of connector 124. The embodiments vary according to the material from which system 100 and it components are made. Referring now to FIG. 3, connector 124 is shown having threads on the interior of cylindrically-walled stub 126. This configuration is preferred for when system 100 and its components are manufactured from metals such as iron, steel, or aluminum. In such a case, a conduit having corresponding threads is threaded to stub 126 via threads 300.

Referring now to FIG. 4, connector 124 is shown having threaded holes 400 and set screws 402. Holes 400 extend through cylindrically-walled stub 126 and freely communicate with inner space 128. This configuration is preferred for when system 100 and its components are made from cast aluminum. In such a case, a conduit is inserted into stub 126 and affixed thereto via set screws 402. It should be appreciated that the number and location of holes 400 and set screws 402 can be varied.

Referring now to FIG. 5, connector 124 is shown with a smoothly walled cylindrical stub 126. This configuration is preferred for when system 100 and its components are made from a plastic material. In such a case, a conduit is cemented or otherwise bonded with a bonding material to the inner wall of stub 126.

It should also be noted that in all embodiments, stub 126 can have configurations other than cylindrically-walled. For example, stub 126 can be polygonal in nature wherein it has more or less than eight sides (i.e., octagonal). Such a configuration is advantageous for gripping such as when pliers are used to turn, rotate, or otherwise hold connector 124. Alternatively, stub 126 can be cylindrically-walled with longitudinal projections extending from and running along the outer cylinder wall. Such a configuration would, once again, provide an advantage when gripping connector 124 when using pliers to turn, rotate, or otherwise hold connector 124. Stub 112 of conduit body 102 can incorporate these same configurations.

Moreover, stub 126 and alignment interface 130 can be integrally manufactured or separately manufactured and fastened together. Integral manufacturing can take the form of machining and casting metals and plastics. Separate manufacture can take the form of machining and/or casting each portion individually and fastening them together. The fastening can be provided via threads integral to each component or bonding surfaces for cementing or welding each component together. Hence, connector 124 can be manufactured via a plurality of methods. Conduit body 102 can be similarly manufactured with respect to its housing 103 and stub 112.

Figure 6:
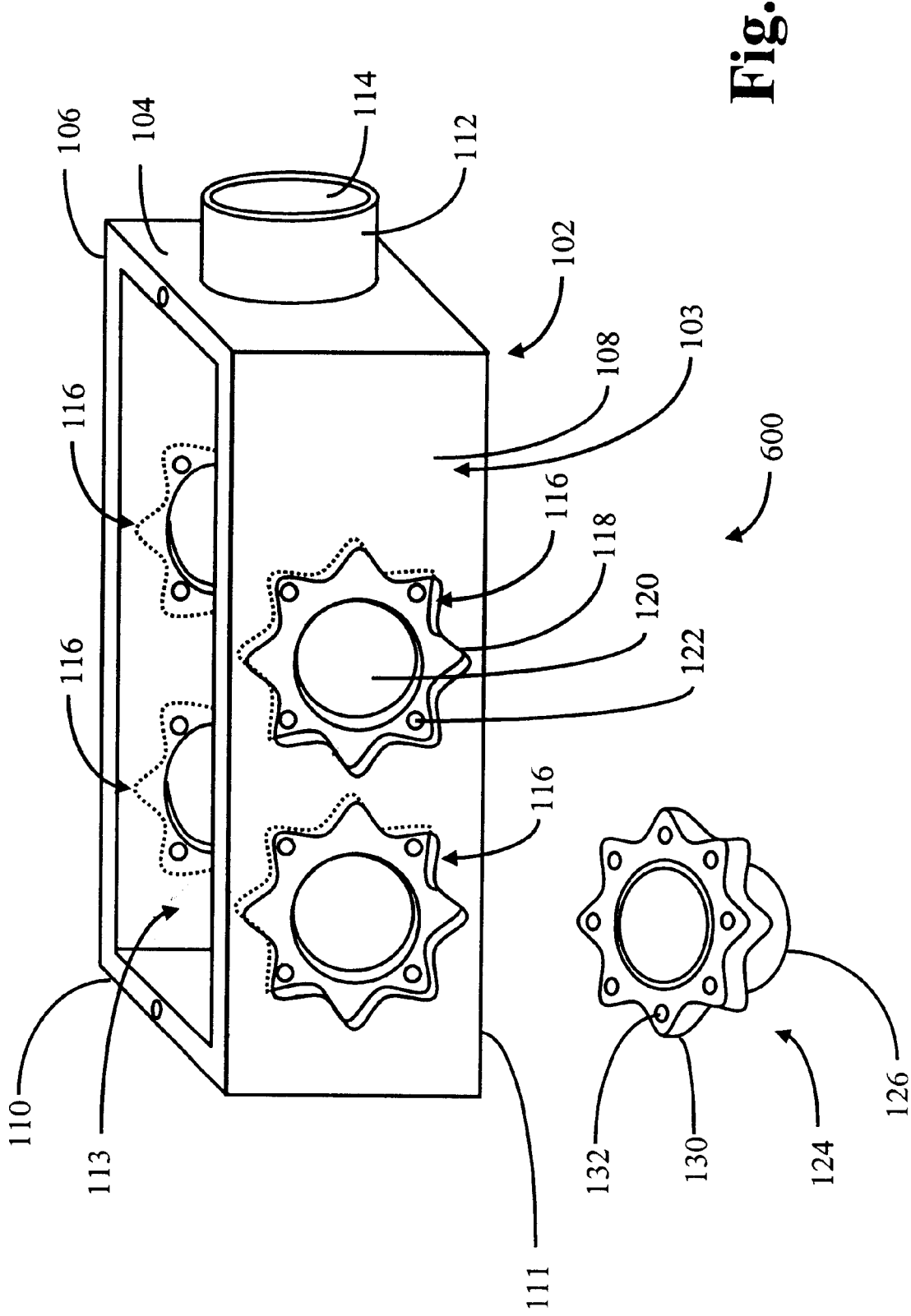
FIGS. 6 through 9 generally illustrate the system of FIG. 1 arranged for LB, LL, LR, and T configurations.
Figure 7:
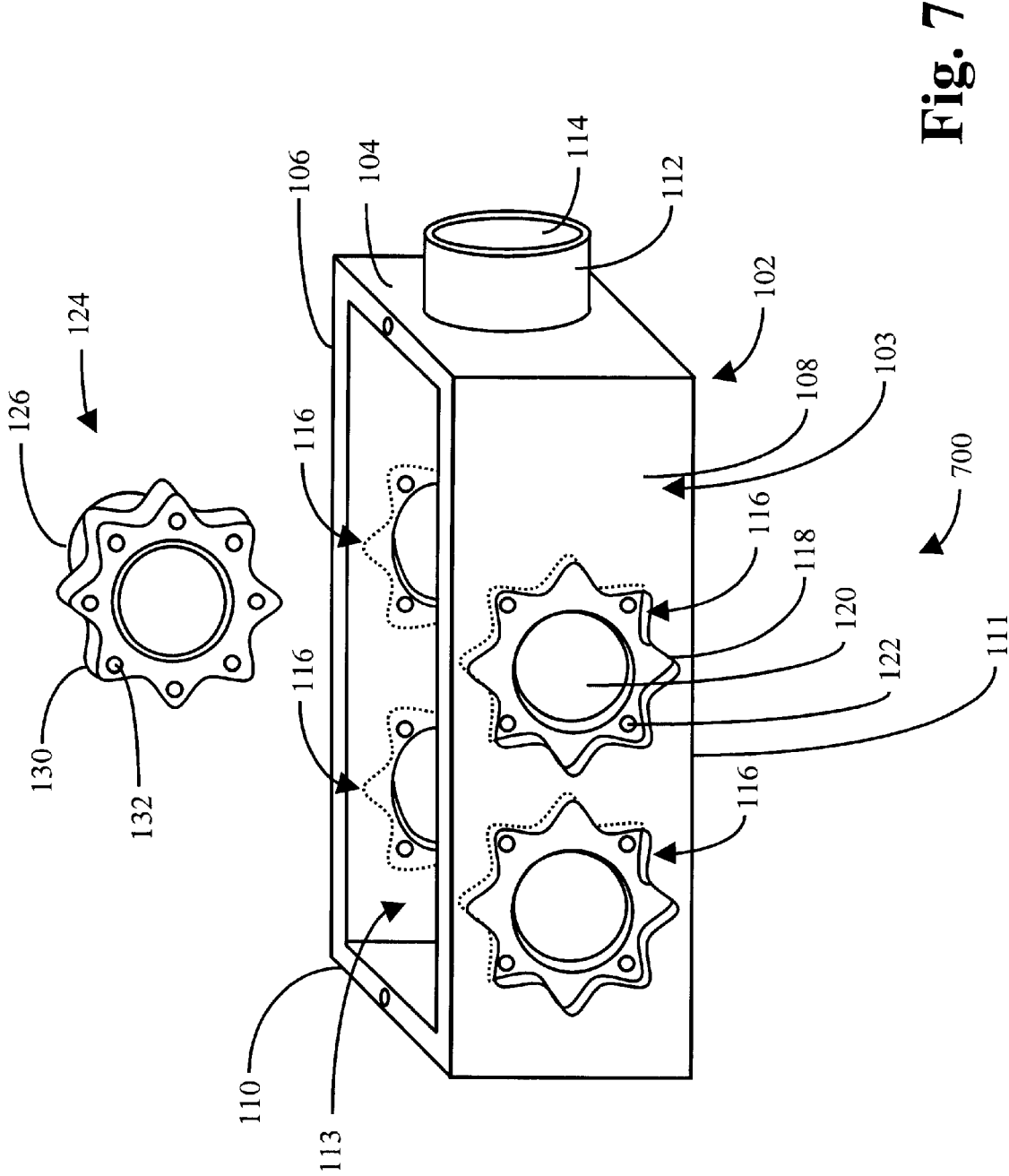
Figure 8:
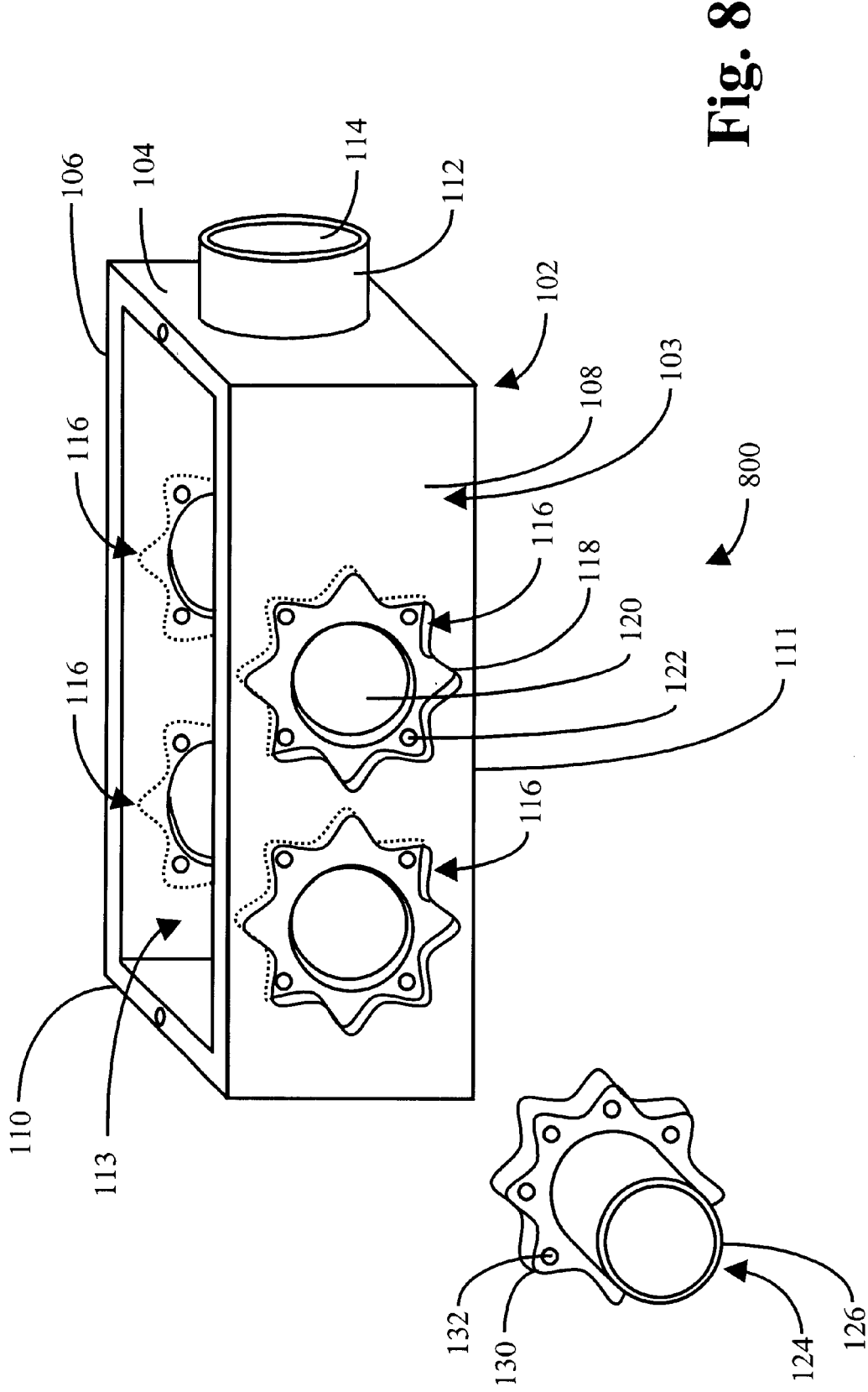
Figure 9:
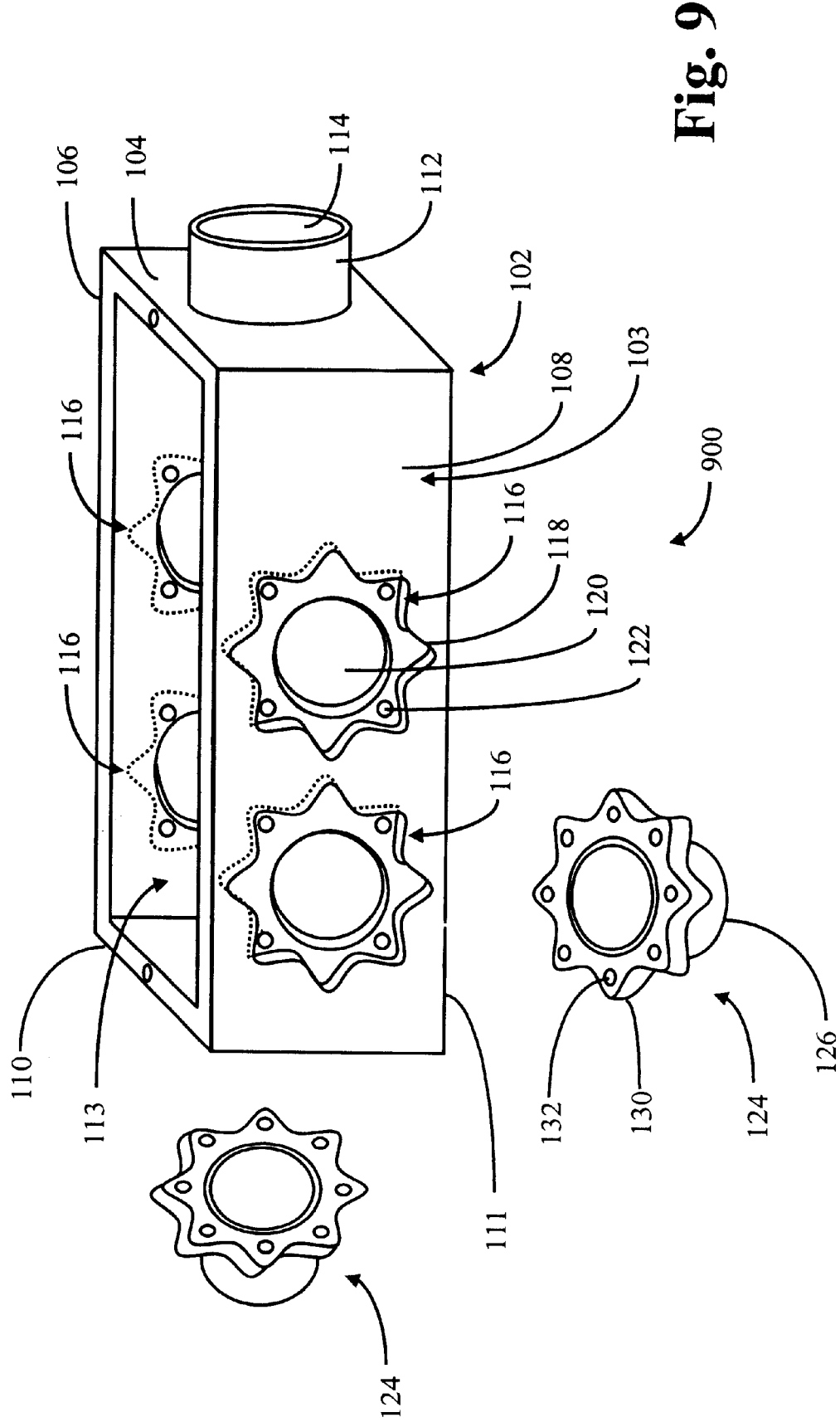

FIGS. 6 through 10 illustrate the present invention arranged in various industry configurations. In these figures, cover plate 150, optional gaskets 136 and 152, and screws or bolts 134 and 154 are not illustrated for purposes of clarity. However, it should be understood that as described above these components can also form part of the arrangements shown. In this regard, FIG. 6 illustrates the present invention in the LB configuration shown generally at 600. In this configuration, connector 124 is aligned and affixed to port 116 in bottom side wall 111 of the conduit body. FIG. 7 illustrates the present invention in the LL configuration shown generally at 700. In this configuration, connector 124 aligns and affixes to port 116 in side wall 106. FIG. 8 illustrates the present invention in the LR configuration shown generally at 800. In this configuration, connector 124 aligns and affixes to port 116 in side wall 108. FIG. 9 illustrates the present invention in the T configuration shown generally at 900. In this configuration, two connectors 124 are used. A first connector 124 aligns and affixes to port 116 in bottom side wall 111 and a second connector 124 aligns and affixes to port 116 in side wall 110. FIG. 10 illustrates configuration 1000 with multiple connectors 124 and ports 116. In all of the aforementioned embodiments, port cover plates 144 are used to seal unused ports 116 in the side walls.

The system of the present invention is applicable to conduits for carrying power cable or wire, signal wire or cable and fiber optic cable. The materials and arrangement of the present invention provide for use in above ground and below ground vault installations. Connectors connect to conduits typically by threads (in the case of IMC, HW conduit); via a smooth shank with set screws (in the case of Electrical Metallic Tubing (EMT) or thin wall conduit) or via a smooth shank which may be bonded (in the case of PVC or plastic conduit).

The conduit bodies 102 and other system components can be formed by castings of malleable iron or aluminum, or moldings of suitable plastic material such as polyvinyl chloride (PVC). As described above, the present invention provides for connectors 124 that are 1) threaded with inside female tapered threads to mate with male tapered threads cut on the end of a conduit (in the case of Intermediate Metal Conduit (IMC) or HW conduit); 2) smooth with set screws that tightly hold a conduit in place (in the case of EMT or thin wall conduit); or 3) smooth for bonding a conduit permanently in place (in the case of PVC or plastic conduit). The tapered threads of IMC or HW conduit cause a conduit and the connector 124 to become securely engaged and be held firmly in place. When using EMT or thin wall conduit, the connector 124 need not be threaded, but have the inside diameter of stub 126 approximately equivalent to the outside diameter of the conduit. Then, by using set screws, the conduit is held firmly in place. Where plastic conduit is to be utilized, the conduit body 102 can likewise be plastic and the connectors 124 need not be threaded but rather may have a stub 126 inside diameter approximately equivalent to the outside diameter of the conduit to facilitate mating, and, attachment via solvent bonding or other adhesive techniques.

The present invention also provides the capability of using combinations of connectors of different sizes with a given conduit body. For example, a 2 inch conduit body can be fitted with combinations of differently sized connectors such as, for example, a 2 inch connector, 1 ½ inch connector, 1 inch connector, ¾ inch connector, etc. The size of the connector is typically defined by the size of conduit to be attached to the connector's stub portion. Such a feature is highly advantageous because it provides for the addition of a connector to a larger conduit body at a later date with a minimum of effort and provides flexibility in selecting an appropriately sized conduit.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the shape of the recess 118 and alignment interface 130 can be any shape which suitably assists in aligning connector 124 with port 116. Additionally, it should be readily apparent that the present invention is applicable to junction boxes, pull boxes, device boxes, switch boxes, and any other types of electrical connectors or enclosures including explosion proof and weatherproof boxes and connectors. Moreover, it should also be readily apparent that the present invention can be manufactured according to industry types including JB, JL, JAL, GS, SHE, RS, WB, WE, GE, FS, FD, etc. system components. Therefore, the invention, in its broader aspects, is not limited to the specific details, the representative apparatus, and illustrative examples shown and described. Accordingly, departures can be made from such details without departing from the spirit or scope of the applicant's general inventive concept.

We claim:

1. A universal conduit body comprising:
   (a) an outer housing having a first wall thickness, at least one port and an inner space;
   (b) each port comprising an opening in the housing and a recess in the housing surrounding the opening;
   (c) each recess comprising a second wall thickness less than the first wall thickness; and wherein the recess has at least one opening for accepting a fastener.

2. The conduit body of claim 1 wherein the recess further comprises a shape having a central portion and at least one extension.

3. The conduit body of claim 1 wherein the recess further comprises a shape having a plurality of extensions.

4. The conduit body of claim 1 wherein the recess further comprises a shape having eight extensions.

5. The conduit body of, claim 1 wherein the recess further comprises a shape having a varying radial geometry.

6. The conduit body of claim 1 wherein the recess further comprises a polygon shape.

7. The conduit body of claim 1 wherein the recess is configured to align a connector device to the conduit body.

8. The conduit body of claim 1 wherein the housing further comprises a stub portion having a hollow space for connecting the housing to a wire carrying body.

9. The conduit body of claim 1 wherein the housing further comprises a removable plate having a shape configured to be placed at least partially, within the recess for covering the port when not in use.

10. A conduit body comprising:
    a housing means having a plurality of porting means and an inner space; and
    each porting means comprising an aperture in the housing means and a means for aligning a connector to the porting means, wherein the means for aligning comprises an indentation in the housing surrounding said aperture, and wherein the means for aligning further comprises means for fastening the connector; and
    wherein the indentation comprises a plurality of depressions surrounding the aperture.

11. The conduit body of claim 10 wherein the plurality of depressions comprise a shape having a plurality of extensions emanating from a central portion.

12. The conduit body of claim 10 wherein the plurality of depressions comprise a polygon shape.

13. The conduit body of claim 10 wherein the housing means further comprises means for interfacing the conduit body to at least one rigid conduit.

14. The conduit body of claim 10 further comprising means for covering said porting means when said porting means is not in use.

15. A universal conduit system comprising:
    (a) a conduit box comprising:
        (1) an outer housing having a first wall thickness, at least one port and an inner space;
        (2) the port comprising an opening in the housing and a recess in the housing surrounding the opening; and
        (2) each recess comprising a second wall thickness less than the first wall thickness and at least one opening for accepting a fastener; and
    (b) a connector comprising:
        (1) a stub portion having a hollow space for communicating with the inner space; and
        (2) an interface in physical communication with the stub portion and configured to be accepted at least partially within the recess of the conduit box.

16. The system of claim 15 wherein the recess and interface each comprise a central portion and a plurality of extensions.

17. The system of claim 15 wherein the recess and interface each comprise a polygon shape.

18. The system of claim 15 further comprising a removable plate having a shape configured to placed at least partially within the recess for covering the port when not in use.

19. The system of claim 15 further comprising a gasket for placing between the recess and interface.

20. The system of claim 15 further comprising a second connector, wherein the first connector is configured for attaching a first size conduit and the second connector is configured for attaching a second size conduit.

* * * * *